United States Patent [19]

Baker

[11] 4,365,006

[45] Dec. 21, 1982

[54] FUEL CELL SYSTEM FOR MOBILE APPLICATIONS

[75] Inventor: Bernard S. Baker, Brookfield Center, Conn.

[73] Assignee: Energy Research Corporation, Danbury, Conn.

[21] Appl. No.: 247,877

[22] Filed: Mar. 26, 1981

[51] Int. Cl.³ .............................................. H01M 8/04
[52] U.S. Cl. ..................................................... 429/17
[58] Field of Search ........................ 429/17, 29, 46, 20

[56] References Cited

U.S. PATENT DOCUMENTS

| | | | |
|---|---|---|---|
| 3,511,715 | 5/1970 | Angus | 429/17 |
| 3,539,395 | 11/1970 | Bartas | 429/17 |
| 3,607,419 | 9/1971 | Keating, Jr. | 429/17 |
| 3,615,850 | 10/1971 | Chludzinski | 429/17 |
| 4,001,041 | 1/1977 | Menard | 429/17 |
| 4,120,787 | 10/1978 | Yargeau | 429/17 X |
| 4,202,933 | 5/1980 | Reiser | 429/17 X |

Primary Examiner—Charles F. LeFevour

[57] ABSTRACT

A fuel cell system wherein a fuel conditioner supplied with fuel and with exhausted cathode gas is adapted to partially oxidize a portion of the fuel with the cathode exhaust gas and to utilize at least the water in the oxidation products and at least the water in the cathode exhaust gas to steam reform a portion of the fuel to produce fuel process gas.

39 Claims, 1 Drawing Figure

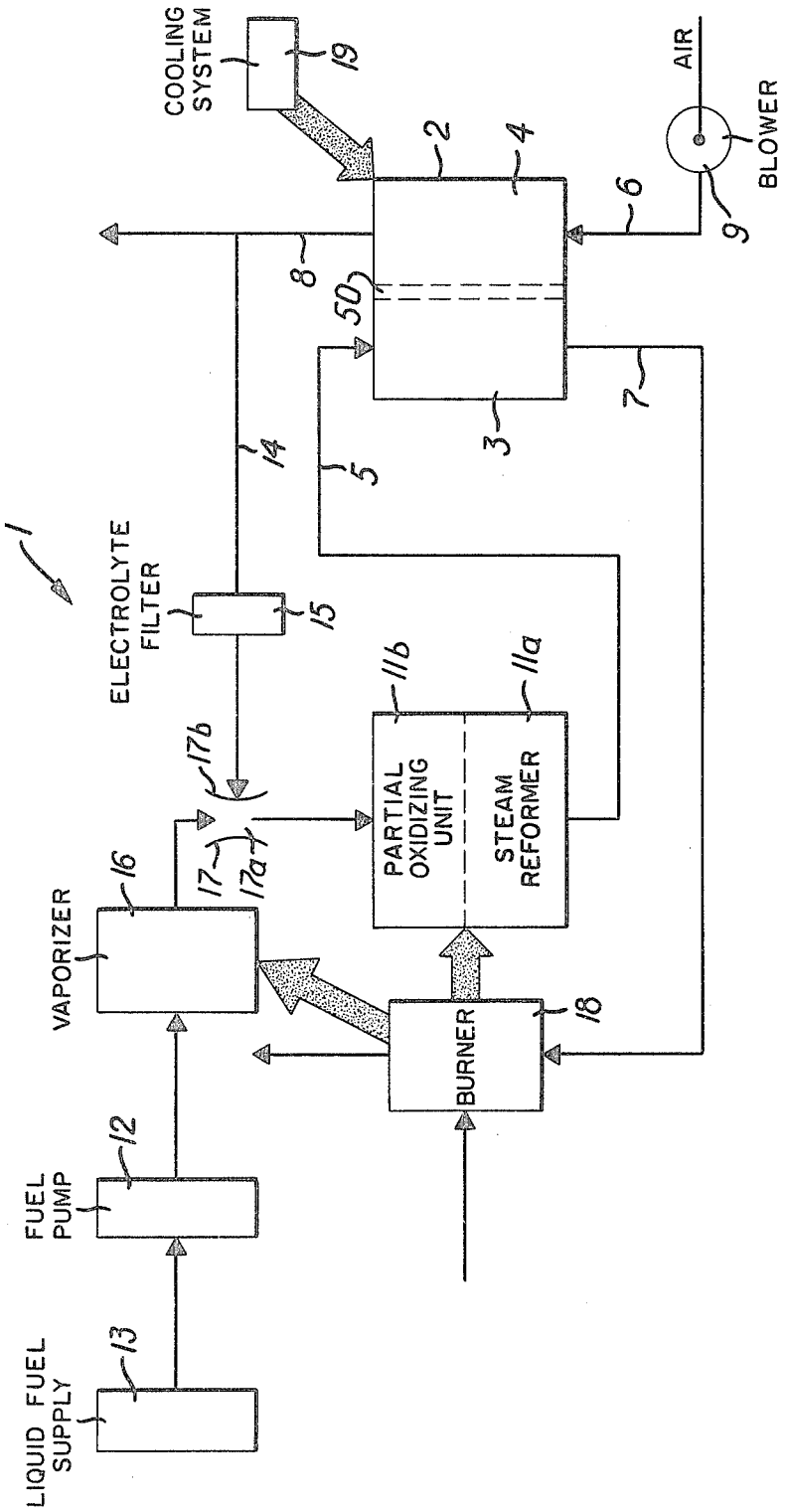

FUEL CELL SYSTEM FOR MOBILE APPLICATIONS

BACKGROUND OF THE INVENTION

This invention pertains to fuel cell systems and, in particular, to fuel cell systems useful in mobile applications.

Recently, considerable interest has been expressed in the development of fuel cell systems for mobile applications. One prime goal in the design of fuel cell systems of this type is to realize systems which are as light as possible. Light-weight fuel cell systems, however, are difficult to realize following customary design principles.

More particularly, fuel cells generate electricity through galvanic combustion of fuel process gas with oxidant process gas. Typically, the oxidant process gas is air which can be obtained from the fuel cell environment with little, if any, processing. The fuel process gas, on the other hand, is usually hydrogen and its generation requires processing in the form of carbon conversion via cracking, partial oxidation or steam reforming or a combination of these reactions such as autothermal reforming. To obtain maximum hydrogen from hydrocarbon, the most suitable of these techniques is steam reforming. Steam reforming, however, requires water which must be obtained either from a water supply or by recovery of the water produced by the fuel cell during operation. With large scale stationary systems obtaining such water presents no significant problem, as there is usually available a water supply and/or heat exchange equipment for water recovery. However, in systems for mobile use, the excessive weight of the required heat exchange equipment makes the use of such equipment impractical. Most mobile type systems have, thus, turned to carrying a portable water supply which adds to the weight of the system, but to a lesser degree than conventional heat exchange equipment. In these systems the water from the portable supply is added to the hydrocarbon fuel which is then steam reformed to produce the hydrogen fuel process gas. Methanol and ethanol are attractive fuels for this purpose, since they can be converted by steam reforming to hydrogen at relatively low temperatures.

While the above-described systems utilizing a portable water supply can be employed, lighter weight portable systems are still being sought.

It is a primary object of the present invention to provide a fuel cell system which can be advantageously used in mobile applications.

It is a further object of the present invention to provide a fuel cell system which can be of lighter weight than presently contemplated systems.

SUMMARY OF THE INVENTION

In accordance with the principles of the present invention, the above and other objectives are realized in a fuel cell system wherein fuel and fuel cell cathode exhaust gas are supplied to a fuel conditioner which is adapted to partially oxidize a portion of the fuel with the cathode exhaust gas and to utilize, at least the water in the oxidation products and at least the water in the cathode exhaust gas to convert a portion of the fuel to fuel process gas. In further contemplation under the invention, electrolyte in the cathode exhaust gas is filtered to prevent poisoning of the fuel conditioner catalyst and the filtered cathode exhaust gas is increased in pressure by injecting the gas into the fuel. The latter could be accomplished by moving the fuel in a vaporized state past the gas.

BRIEF DESCRIPTION OF THE DRAWINGS

The above and other features and aspects of the present invention will become more apparent upon reading the following detailed description in conjunction with the accompanying drawings in which the sole FIGURE illustrates a fuel cell system in accordance with the principles of the present invention.

DETAILED DESCRIPTION

The FIGURE illustrates a fuel cell system 1 incorporating features of the present invention. A fuel cell 2 having an anode section 3 and a cathode section 4 receives fuel process gas and oxidant process gas via respective input conduits or lines 5 and 6. These gases undergo electrochemical reaction via the fuel cell electrolyte 50 communicating with the anode and cathode sections. Output conduits 7 and 8 carry anode and cathode exhaust gases from the anode and cathode sections, these exhaust gases being the products which result after electrochemical reaction.

In customary practice, the oxidant process gas is air which is introduced into the input conduit via a blower 9. Similarly, in further customary practice, the fuel process gas is primarily hydrogen which is derived by steam reforming hydrocarbon fuel in a steam reformer 11a of a fuel conditioner 11. The latter fuel is derived from a fuel pump 12 being fed by a fuel supply 13.

In accordance with the principles of the present invention, the water required for steam reforming the hydrocarbon fuel is obtained through utilization of a portion of the cathode exhaust gas. As will be explained more fully below, this gas serves both as a direct supplier of water and as a means for deriving water from the hydrocarbon fuel.

More specifically, a conduit 14 is provided for coupling the desired portion of cathode exhaust gas from the conduit 8. The coupled exhaust gas in the conduit 14 is then combined with the hydrocarbon fuel for entry into a partial oxidizing unit 11b, which unit is included in the conditioner 11 and precedes the steam reformer 11a. Partial oxidizing unit 11b, utilizing the unused oxidant gas and other products in the cathode exhaust gas, causes oxidation of a small portion of the hydrocarbon fuel, whereby water is produced as one product of the oxidation. The oxidation products, including the produced water, as well as the remaining fuel and the remaining cathode exhaust gas, which itself includes water produced during the fuel cell electrochemical reaction, are then coupled to the steam reformer 11a.

By proper selection of the amount of coupled cathode exhaust gas and by proper control of the oxidation process, the total water content (water produced by oxidation and water in the exhaust gas) in the input constituents to the reformer 11a is made sufficient to enable successful steam reforming of the introduced fuel. The output of the reformer 11a, therefore, contains the necessary hydrogen content for electrochemical reaction in the fuel cell 2.

As can be appreciated, the cathode exhaust gas coupled to the conduit 14, in addition, to air and water constituents also might contain some electrolyte constituent as a result of the electrochemical reaction. Since such electrolyte constituent is detrimental to reformer activity, i.e., could severely poison the reformer catalyst, an electrolyte filter 15 is utilized to remove the electrolyte prior to application to the reformer 11a. Conveniently, in the case shown, the filter 15 is situated in the conduit 14. However, the filter also could be situated elsewhere, as long as it precedes the steam reformer 11a.

To compensate for pressure losses due to gas passage through the conditioner 11, filter 15 and the cell 2, the cathode exhaust gas coupled to conduit 14 is combined with the hydrocarbon fuel by first vaporizing the fuel in vaporizer 16 and then utilizing the vaporized fuel to promote injection of the exhausted gas from the conduit 14 into the vaporized fuel. To this end, the vaporized fuel is introduced into the central bore 17a of a venturi nozzle 17 whose jet port 17b communicates with the conduit 14. In this manner, the exhausted cathode gas is injected into the fuel at the increased pressure of the fuel and the combined fuel and gas thereafter introduced into the conditioner 11. It should be noted that other techniques can be utilized to bring the pressure of the exhausted cathode gas to the pressure of the vaporized fuel. Thus, instead of a venturi nozzle, the vaporized fuel and the exhausted gas can be separately introduced into the partial oxidizing unit. In such case, a pump might be utilized to raise the pressure of the exhausted oxidant gas to that of the vaporized fuel.

A burner 18 in thermal contact with the vaporizer 16 provides the necessary heat for vaporizing the pressurized fuel received from pump 12. Heat is generated in the burner by using the anode exhaust gas in the exhaust conduit 7 to burn air introduced into the burner. The heat of the burner might also be used to apply heat to the conditioner 11, if desired.

As can be appreciated, with the present system, water for steam reforming of the input fuel to produce fuel process gas is through recovery of water in the cathode exhaust gas and through the use of the latter gas to develop water from the input fuel. Heavy condensors and heat exchangers customarily employed for this purpose are, therefore, rendered unnecessary. Furthermore, the system does not require a separate water supply for adding water to the fuel. Additionally, even if such a supply were desired, it can be of significantly lesser amount and, hence, considerably lighter, when used in conjunction with the present system.

In order to maximize the amount of water vapor present in the cathode exhaust gas and, therefore useable in the fuel conditioner 11, it is desirable to maintain the oxidant process gas flow at the minimum level required for electrochemical reaction. In practice, this means operating the fuel cell so that the flow of oxidant process gas is kept at between 1.3 to 1.5 times the stoichiometric requirement (i.e., the requirement for electrochemical reaction), in the case of fuel process gas containing substantially no water. In the case of fuel process gas containing water, the upper limit increases and approaches 2 times the stoichiometric requirement for a water content of about 25%.

If the oxidant gas flow exceeds these levels, then a greater quantity of exhausted oxidant gas has to be coupled into the conduit 14 for combining with the fuel for application to conditioner 11. This, in turn, results in less hydrogen production and increased nitrogen production by the reformer and, therefore, a more dilute fuel process gas.

As shown, a conventional cooling system, designated 19, might also be provided for cooling the cell 2. Typical cooling systems might be, for example, two-phase boiling, heat transfer via a liquid or an independent air cooling loop.

Preferable hydrocarbon fuels for the present system are ethanol and methanol, since these fuels can be reformed in steam reformer 11a at relatively lower temperatures than other hydrocarbons. Also, preferably, the fuel cell 2, utilizes phosphoric acid or trifluoromethanesulfonic acid as its electrolyte.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A fuel cell system comprising:
a fuel cell including an anode section for receiving fuel process gas and a cathode section for receiving oxidant process gas;
and means for receiving a supply of fuel and gas exhausted from said cathode section for oxidizing a portion of said fuel with said cathode exhaust gas and for converting a portion of said fuel to said fuel process gas by directly utilizing said oxidized portion of fuel, said converting being with at least the water in the products in said cathode exhaust gas and at least the water in the products in said oxidized portion of fuel.

2. A system in accordance with claim 1 wherein:
said oxidizing and converting means includes:
a partial oxidizing means for carrying out said oxidation;
and a steam reformer following said partial oxidizing means and directly receiving said oxidized portion of fuel gas for carrying out said conversion.

3. A system in accordance with claims 1 or 2 further comprising:
means for filtering the electrolyte in said cathode exhaust gas prior to converting of said portion of fuel gas to said fuel process gas.

4. A system in accordance with claim 3 wherein:
said filtering means precedes said means for oxidizing and converting.

5. A system in accordance with claim 1 further comprising:
means for increasing the pressure of said cathode exhaust gas.

6. A system in accordance with claim 5 wherein:
the pressure of said cathode exhaust gas is increased to that of said fuel.

7. A system in accordance with claim 5 wherein:
said pressure increasing means precedes said oxidizing and converting means.

8. A system in accordance with claim 5 wherein:
said system further includes means for vaporizing said fuel.

9. A system in accordance with claim 8 wherein:
said pressure increasing means includes nozzle means for combining said vaporized fuel and said cathode exhaust gas so as to increase the pressure of said cathode exhaust gas;
and said oxidizing and converting means receives said combined vaporized fuel and said increased pressure exhaust gas from said nozzle means.

10. A system in accordance with claim 9 wherein:

said nozzle means comprises a venturi nozzle having a main bore for receiving said vaporized fuel and a jet port for receiving said exhaust gas.

11. A system in accordance with claim 8 further comprising:
a burner responsive to exhaust gas from said anode section for burning air to produce heat;
and means for coupling said heat to said vaporizing means.

12. A system in accordance with claim 11 further comprising:
further means for coupling said heat to said oxidizing and converting means.

13. A system in accordance with claim 1 wherein:
said fuel is one of methanol and ethanol.

14. A system in accordance with claim 1 wherein:
said fuel cell further includes an acid electrolyte.

15. A system in accordance with claim 14 wherein:
said acid is trifluoromethanesulfonic acid.

16. A system in accordance with claim 14 wherein:
said acid is phosphoric acid.

17. A system in accordance with claims 14 further comprising:
means for filtering the acid electrolyte in said cathode exhaust gas.

18. A system in accordance with claim 1 wherein:
the fuel process gas introduced into said anode section contains substantially no water;
and the flow of oxidant process gas into said cathode section is from about 1.3 to 1.5 times that required for electrochemical reaction.

19. A system in accordance with claim 1 wherein:
the fuel process gas introduced into said anode section contains up to about 25% water;
and the flow of oxidant process gas into said cathode section is up to about 2 times that required for electrochemical reaction.

20. A system in accordance with claim 1, 18 or 19 further comprising:
means for cooling said fuel cell.

21. A process in which fuel process gas and oxidant process gas are introduced into anode and cathode sections, respectively, of a fuel cell and further comprising:
oxidizing a portion of supply fuel with gas exhausted from said cathode section;
and converting a portion of said fuel to said fuel process gas by directly utilizing said oxidized portion of fuel, said converting being with at least the water in the products in said cathode exhaust gas and at least the water in the products in said oxidized portion of fuel.

22. A process in accordance with claim 21 wherein:
said step of converting includes steam reforming.

23. A process in accordance with claims 21 or 22 further comprising:
filtering the electrolyte in said cathode exhaust gas prior to converting of said portion of fuel gas to said fuel process gas.

24. A process in accordance with claim 23 wherein:
said filtering is carried out prior to said oxidizing and converting.

25. A process in accordance with claim 21 further comprising:
increasing the pressure of said cathode exhaust gas.

26. A process in accordance with claim 25 wherein:
the pressure of said cathode exhaust gas is increased to that of said fuel.

27. A process in accordance with claim 26 wherein:
increasing of said pressure occurs prior to said oxidizing and converting.

28. A process in accordance with claim 25 further comprising:
vaporizing said fuel.

29. A process in accordance with claim 28 further comprising:
combining said vaporized fuel and said increased pressure cathode exhaust gas prior to said oxidizing.

30. A process in accordance with claim 21 wherein:
said fuel is one of methanol and ethanol.

31. A process in accordance with claim 21 wherein:
said fuel cell includes an acid electrolyte.

32. A process in accordance with claim 31 wherein:
said acid is trifluoromethanesulfonic acid.

33. A process in accordance with claim 31 wherein:
said acid is phosphoric acid.

34. A process in accordance with claim 31 further comprising:
filtering the acid electrolyte in said cathode exhaust gas.

35. A process in accordance with claim 21 wherein:
the fuel process gas introduced into said anode section contains substantially no water;
and the flow of oxidant process gas into said cathode section is from about 1.3 to 1.5 times that required for electrochemical reaction.

36. A process in accordance with claim 21 wherein:
the fuel process gas introduced into said anode section contains up to about 25% water;
and the flow of oxidant process gas into said cathode section is up to about 2 times that required for electrochemical reaction.

37. A process in accordance with claim 21, 35 or 36 further comprising:
means for cooling said fuel cell.

38. A system as described in claim 1 or 2 wherein:
said converting is by directly utilizing said cathode exhaust gas subsequent to said oxidizing of said portion of fuel.

39. A method in accordance with claim 21 wherein:
said converting is by directly utilizing said cathode exhaust gas subsequent to said oxidizing of said portion of fuel.

* * * * *